Sept. 6, 1949.　　　　F. I. STEELE ET AL　　　　2,481,454
ARRESTING AND ACCESS MEANS
Filed Oct. 26, 1946　　　　　　　　　　　　2 Sheets-Sheet 1
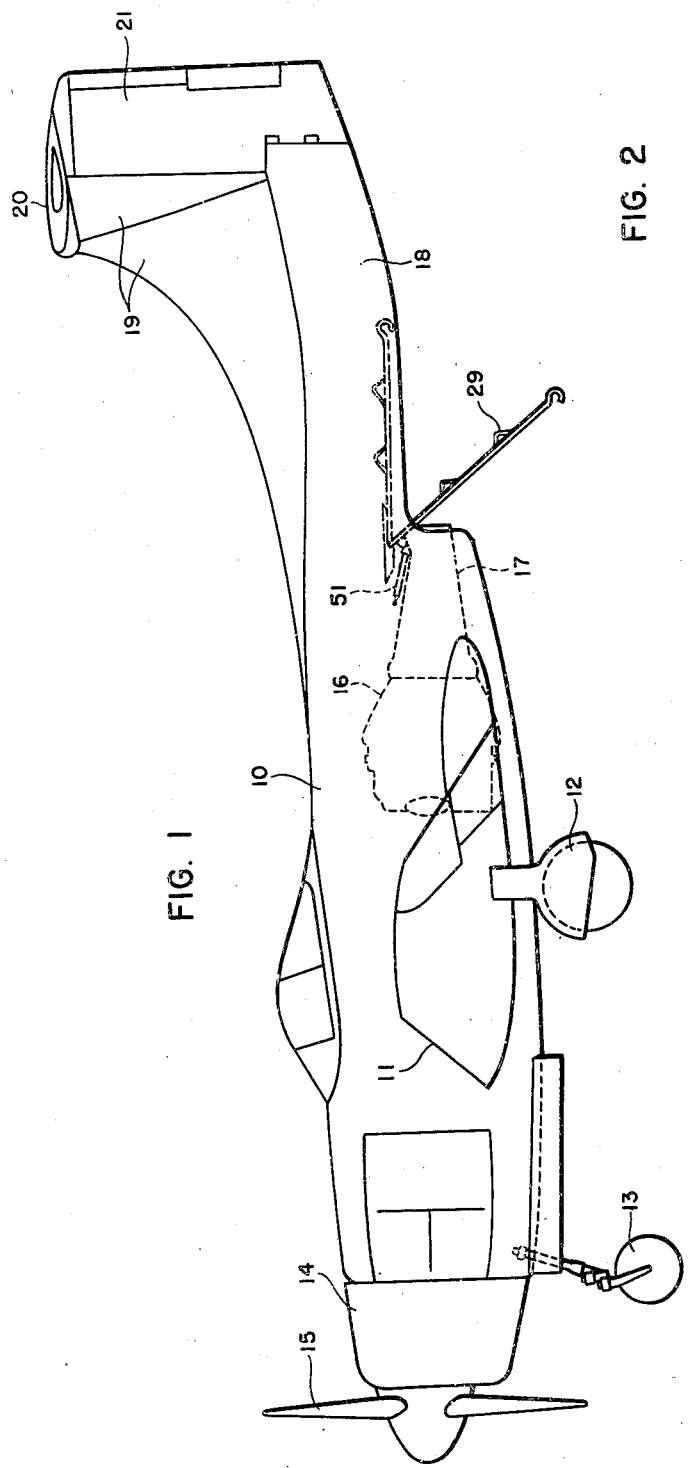
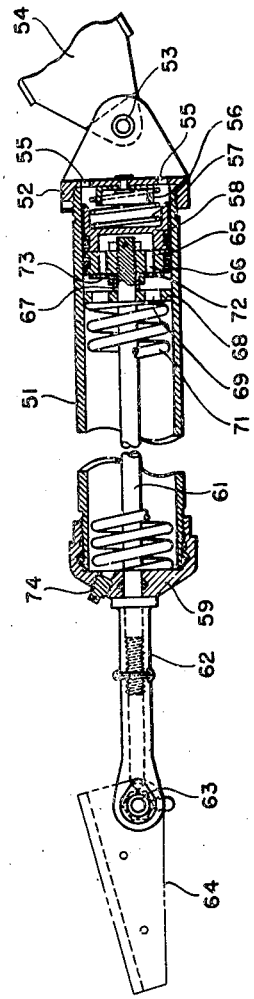
INVENTOR.
FREDERICK I. STEELE
BY QUENTIN P. THOMPSON
　　*Richard W. Treverton*
　　　　ATTORNEY Sept. 6, 1949.  F. I. STEELE ET AL  2,481,454
ARRESTING AND ACCESS MEANS
Filed Oct. 26, 1946  2 Sheets-Sheet 2
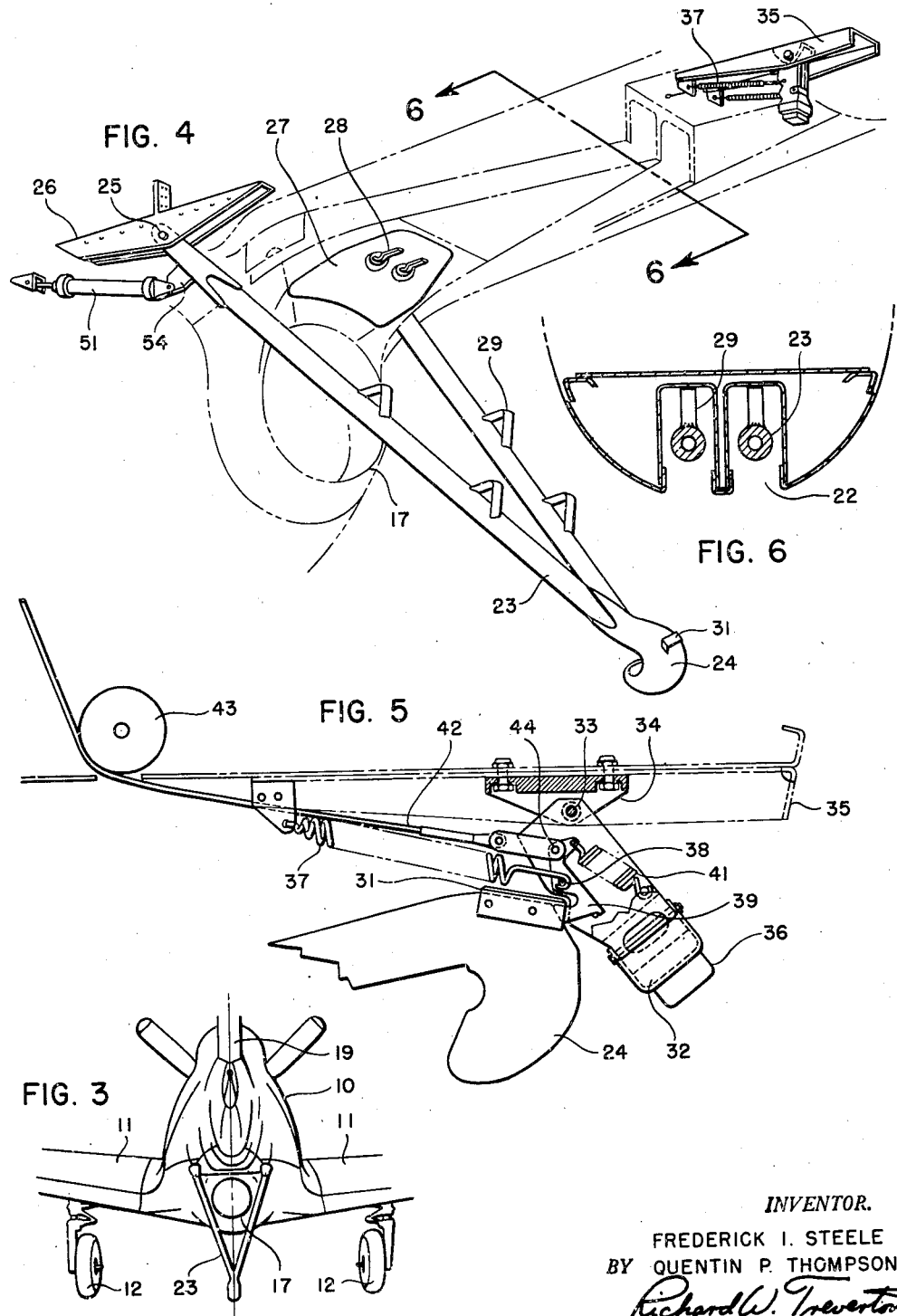
INVENTOR.
FREDERICK I. STEELE
BY QUENTIN P. THOMPSON
ATTORNEY Patented Sept. 6, 1949

2,481,454

UNITED STATES PATENT OFFICE 2,481,454

ARRESTING AND ACCESS MEANS

Frederick I. Steele, Columbus, Ohio, and Quentin P. Thompson, Kenmore, N. Y., assignors to Curtiss-Wright Corporation, a corporation of Delaware Application October 26, 1946, Serial No. 705,890

8 Claims. (Cl. 244—110)

The present invention relates to arresting gear for aircraft and particularly for jet propelled aircraft.

In certain designs of jet propelled aircraft the airframe extends rearwardly from and above the level of tail pipe of the jet propulsion unit, and an access door to the compartment containing the unit is provided in this overhanging portion of the airframe. The tail pipe is disposed approximately in the zone otherwise favorable for the location of an arresting hook that is used when the aircraft is landed on short runways such as those provided on shipboard.

According to the present invention the overhanging portion of the airframe is provided with a substantially V-shaped recess straddling the access door. A bifurcated arresting hook is hinged to the aircraft for retractive movement into such recess and for movement to an extended or operative position wherein the jet issuing from the propulsion unit passes between the furcations of the hook. The hook is preferably provided with step formations enabling it to be used as a ladder to provide ready access, through the door that is straddled by the hook, to the propulsion unit or other mechanism within the aircraft.

Latch means operated from the pilot's compartment of the aircraft are provided to release the hook from its normal, retracted position; and associated with the latch means is a bumper to prevent damage to the aircraft resulting from rebound of the hook subsequent to its release. Means are also provided to expedite movement of the hook from retracted to extended position and for dampening or snubbing rebound from the extended position.

The dampening means include an hydraulic cylinder and piston arrangement provided with automatic valve means for allowing rapid extension of the hook and for resisting rapid retraction thereof. Means are provided to automatically vary the volume of the cylinder chamber so that it will, in effect, be filled with hydraulic fluid at all times.

The foregoing and other objects and advantages of the invention will become apparent from the following description of the embodiment shown in the accompanying drawings, wherein:

Figure 1 is a side elevational view of an aircraft with the jet type propulsion unit shown in dotted lines, and with the arresting hook, which is shown in extended position by full lines, indicated in retracted position by broken lines;

Figure 2 is a sectional detail view of the cylinder and piston arrangement of the dampening unit and associated parts;

Figure 3 is a fragmentary rear elevation of the aircraft showing the relation of the jet tail pipe to the bifurcated arresting hook in the extended position of the latter;

Figure 4 is a perspective view of the arresting hook in extended position, showing its relation with the access door, the rebound dampening means and the latch means;

Figure 5 is a detail vertical sectional view illustrating the latch mechanism for holding the hook retracted, with the associated aircraft parts indicated by broken lines; and Figure 6 is a fragmentary detail cross-section taken through the aircraft at approximately the point indicated by line 6—6 in Figure 4, but showing the nested relationship of the arresting hook, when in retracted position, within the adjacent aircraft structure.

As shown in Figure 1 the aircraft selected for illustration of the invention comprises a fuselage 10, a wing 11, and a tricycle landing gear with main gear 12 and nose gear 13. A power plant in the nose of the fuselage for driving a bladed propeller 15 is covered by a cowling 14. In the fuselage belly is disposed a turbo-jet engine 16 with a tail pipe 17 through which the propellant gases are exhausted, the exhaust jet passing rearwardly beneath the overhanging tail portion 18 of the fuselage. The latter supports a vertical fin structure 19 to the rear edge of which is hinged a rudder 21 and to the upper edge of which is secured a vertical stabilizer 20 which in turn hingedly supports at the trailing edge thereof the elevator surface of the aircraft.

The undersurface of the overhanging tail portion 18 of the fuselage is provided with a pair of indentations 22 which together define a bifurcated or substantially V-shaped recess, with the forward ends of the indentations located above and to opposite sides of the tail pipe 17. Normally disposed in this recess is a V-shaped arresting hook member 23 having a hook formation 24 at its apex. The fore ends of the furcations of the hook member are pivoted by pins 25 to channel members 26 attached to the fuselage.

Mounted upon the aircraft tail portion between the indentations 22 is a door 27 which may be swung to open position upon operation of handle means 28. The door provides access to a compartment containing the jet reaction engine 16. To facilitate such access there are provided on the hook member a plurality of step formations 29 enabling it to function as a ladder when in its extended position shown in full lines in Figures 1 and 4.

A member 32 is pivoted at 33, for fore and aft swinging motion, to a bracket 34 within a channel member 35 that is secured to the fuselage structure. A bumper 36 of rubber or like cushioning material is carried by member 32. The bumper is arranged to engage the flat upper surface of latch detent 31 on the hook 24 should the hook member move upwardly while the member 32 is in its forward position shown in Figure 4. Springs 37 connected by pin 38 to member 32 normally retain the latter in such forward position.

Pivoted upon the pin 38 is a latch 39 that is engageable with the undersurface of the detent 31 on the hook upon the latter being raised at a time when the member 32 is held in its rearward position shown in Figure 5. The latch is held in latching position by a spring 41, and is released by a pull cable 42 which passes over a guide sheave 43 and is connected to the latch at 44. The opposite end of the cable may be connected to a suitable hook release lever or the like (not shown) in the pilot's compartment of the aircraft.

For controlling the hook member subsequent to its release, the device shown in detail in Figure 2 is provided. It includes a cylinder 51 closed at one end by a member 52 that is pivoted at 53 to a lug 54 formed on the hook member. Closure member 52 has atmospheric vents 55 and supports a cup 56 around which extends a coil spring 57. The latter engages a piston 58 that is slidable in the cylinder bore and has a substantially liquid tight seal therewith. The opposite end of the cylinder is closed by a member 59 which has a bore passing piston rod 61. By means of an adjustable fitting 62 the rod is pivotally connected at 63 to a bracket 64 that is affixed to the fuselage structure.

Upon the inner end of the piston rod is secured a piston 65 having large perforations 66 for readily by-passing, around the piston, liquid which fills the cylinder between closure 59 and piston 58. Spaced from piston 65 by sleeve 67 is a disc 68, also having large perforations which are designated 69, and which serves as an abutment for a spring 71. The latter urges relative movement of the piston 68 and cylinder 51 in a direction to extend or move to operative position the hook member 23. The disc 68 also serves to limit movement of a valve 72 axially along sleeve 67 from seated position upon the face of piston 65. The valve is provided with only small perforations 73, whose resistance to fluid passage is greater than that of the perforations 66, 69. In order to fill the cylinder with liquid an opening with plug 74 is provided in closure 59.

During normal flight of the aircraft the arresting hook member 23 remains in the position shown by the broken lines of Figure 1, being held within the fuselage recess by latch 39 as shown in Figure 5. Prior to an arrested landing the hook member 23 is released by the latch as a result of pull on cable 42, whereupon the hook member will drop to operative position by combined action of gravity and spring 71, and the member 32 will be swung forwardly by springs 37. The fluid in cylinder 51 retards only slightly such movement of the hook member, since the valve 72 automatically opens by piston by-passing movement of the fluid (the piston 65 moving to the right as it is viewed in Figure 2).

Upon striking the landing strip surface, arresting cable or the like, the hook member may tend to rebound, and such action is snubbed by the hydraulic fluid in the cylinder, since movement of piston 65 to the left in Figure 2 results in the valve 72 closing and thereby retarding the liquid in its by-passing of the piston. However, should the rebound for any reason be sufficient to fully raise the hook member, it will strike against the rubber bumper 36 and therefore will not damage the aircraft. To reset the hook member in retracted position following extension, it is simply raised manually and the member 32 swung rearwardly to allow latch 39 to engage detent 31.

The action of piston 58 backed by spring 57 is to keep the operating chamber of the cylinder substantially full of liquid at all times, despite slight leakage or temperature changes affecting the volume of the liquid.

It will be seen that when the hook is in extended position with the aircraft in flight, as may occur during the approach to a landing, the path of exhaust propulsive gas from the tail pipe 17 is entirely between the furcations of the hook member, so that no interference results. With the aircraft on the ground the hook member, as pointed out above, may be used as a ladder in gaining access to and through the door 27 which is conveniently disposed between the indentations 22.

It will be understood that the principles illustrated by the embodiment herein described and shown may be otherwise embodied without departing from the spirit of the invention or the scope of the appended claims.

We claim:

1. In an aircraft having a propulsion jet tail pipe for exhausting rearwardly from the under side of the fuselage with the aft portion of the fuselage overhanging said pipe, a recess of substantially V-formation provided in said aft portion of the fuselage, and a bifurcated arresting hook member with the end portions of its furcations having pivot connections with the aircraft above and at opposite sides of said pipe, said bifurcated member being retractable about said pivot connections into said recess and extensible therefrom to an operative position straddling the path of an exhaust jet from said pipe.

2. In an aircraft having a propulsion jet tail pipe exhausting rearwardly therefrom, said aircraft having structure extending rearwardly of said pipe above the path of an exhaust jet issuing therefrom, an access door in said structure, said structure having a bifurcated recess straddling said door, a bifurcated arresting hook member hinged to the aircraft adjacent said pipe, said member being arranged to seat within said recess in straddling relation to said door when retracted and when extended to straddle the path of a jet exhausting through said pipe, and said member having steps formed thereon to facilitate access to the aircraft interior through said door when the member is extended.

3. In an aircraft having an access door provided in the under surface thereof, a bifurcated recess in substantially straddling relation to said door, and a bifurcated arresting hook member normally disposed in said recess with the furcated ends thereof hinged to the aircraft on opposite sides of said door, and said member having step formations provided thereon to function as a ladder to facilitate access to the aircraft interior through said door when the member is in extended position.

4. In an aircraft having a rearwardly directed propulsion jet exhaust opening, the aircraft structure extending rearwardly of said opening above the path of an exhaust jet issuing from the opening, a bifurcated recess in the rearwardly extending structure with the ends of the furcations disposed at opposite sides of said exhaust opening, a bifurcated arresting hook normally disposed in said recess and hinged to the aircraft adjacent the ends of said furcations for movement to an extended position wherein the path of the exhaust jet is between the furcations of the hook.

5. In an aircraft having a rearwardly directed propulsion jet exhaust opening, said aircraft having structure extending rearwardly of said opening above the path of an exhaust jet issuing from the opening, a bifurcated arresting hook normally seated adjacent said structure above said path and having the ends of its furcations hinged to the aircraft substantially at opposite sides of said exhaust opening for movement of the hook to an extended position wherein the path of the exhaust jet is between said furcations.

6. In an aircraft provided with a hinged arresting hook member, a control unit pivoted to the aircraft and to said member, said unit comprising a liquid filled cylinder, a piston rod extending through one end of the cylinder, a piston comprising axially spaced parts carried by the inner end of said rod, said piston further comprising a valve movable axially between said piston parts, said valve being movable by pressure of liquid thereon toward and from seated relation with one of said piston parts, and said valve being arranged to restrict passage of liquid past said piston from said one end of the cylinder to a greater extent than reverse passage of liquid, a spring disposed in said cylinder between said one end thereof and said piston, a vented closure for the opposite end of said cylinder, a second piston between said closure and the first mentioned piston, and a spring disposed between the closure and second piston for urging movement of the latter to compensate for variations in the quantity of liquid in the cylinder.

7. In an aircraft provided with an arresting hook element hinged for movement between operative and retracted positions, control means pivoted to said aircraft and to said element, said control means comprising a cylinder having one closed end and one vented end, a first piston and spring means for urging movement of it in said cylinder away from said vented end, liquid in said cylinder between said closed end and said said first piston for restricting such movement of the latter, a piston rod extending into said cylinder and a second piston carried by the rod between the first piston and said closed end, means for by-passing liquid around said second piston including means for resisting such by-passing in one direction, caused by retracting movement of the element, to a greater degree than by-passing in the reverse direction, and spring means for urging relative movement of the second piston and cylinder to produce by-passing in such reverse direction.

8. In an aircraft provided with a hinged arresting hook element movable between extended and retracted positions, a latch detent carried by said element, a member pivoted to the aircraft having a resilient bumper for engagement by said element during retractive movement of the latter when said member is moved pivotally to one position, resilient means for urging said member to said one position, a spring pressed latch carried by said member and engageable with said latch detent upon retractive movement of said element when said member is moved pivotally to another position, and latch release means for moving the latch relative to said member for disengaging the latch detent.

FREDERICK I. STEELE.
QUENTIN P. THOMPSON.

REFERENCES CITED

The following references are of record in the file of this patent:

UNITED STATES PATENTS

| Number | Name | Date |
| --- | --- | --- |
| 1,489,746 | Eagles | Apr. 8, 1924 |
| 1,888,749 | Urquhart | Nov. 22, 1932 |
| 2,419,455 | Lee | Apr. 22, 1947 |